United States Patent

Kupfrian

[15] 3,670,795

[45] June 20, 1972

[54] SELF-LOCKING FASTENER

[72] Inventor: Wilbur J. Kupfrian, Binghamton, N.Y.

[73] Assignee: Barry Wright Corporation

[22] Filed: June 29, 1970

[21] Appl. No.: 50,047

[52] U.S. Cl.............................................................151/29
[51] Int. Cl.......................................................F16b 39/02
[58] Field of Search.....................151/29, 28, 27, 2 R, 44, 33, 151/54, 55

[56] References Cited

UNITED STATES PATENTS

| | | | |
|---|---|---|---|
| 2,728,895 | 12/1955 | Quackenbush et al. | 151/54 X |
| 2,451,636 | 10/1948 | Spiller | 151/29 UX |
| 768,954 | 8/1904 | Romberger | 151/29 |
| 1,374,015 | 4/1921 | Jerruss | 151/29 |
| 1,473,579 | 11/1923 | Hart | 151/2 R |

FOREIGN PATENTS OR APPLICATIONS

| | | | |
|---|---|---|---|
| 496,832 | 12/1938 | Great Britain | 151/29 |

Primary Examiner—Ramon S. Britts
Attorney—Milton E. Gilbert

[57] ABSTRACT

A self-locking fastener that involves a polygonal nut threaded onto a splined or keyed spindle. A sleeve generally encloses the nut and is internally grooved to engage the nut, being keyed for movement longitudinally relative to the nut and for imparting rotary motion to it. A spring urges the sleeve to slide in one direction causing one end to project beyond the end of the nut, in which position the projecting portion forms an internally grooved enclosure. A separate polygonal clamping member, slidable but not rotatable on the spindle, and having a number of sides that is a sub-multiple of the number of grooves, is engaged by the sleeve when the fastener is in the fully tightened position at which time the internally grooved enclosure may engage the polygonal edges of the clamping member to lock the nut on the spindle. Retracting the sleeve disengages the projecting portion from the clamping member, and permits the nut to be unthreaded. The clamping member may be of simple washer form, and although having a number of sides corresponding to a submultiple of the number of grooves, the nut may be indexed and locked in as many positions as there are grooves.

6 Claims, 6 Drawing Figures

INVENTOR
WILBUR J. KUPFRIAN

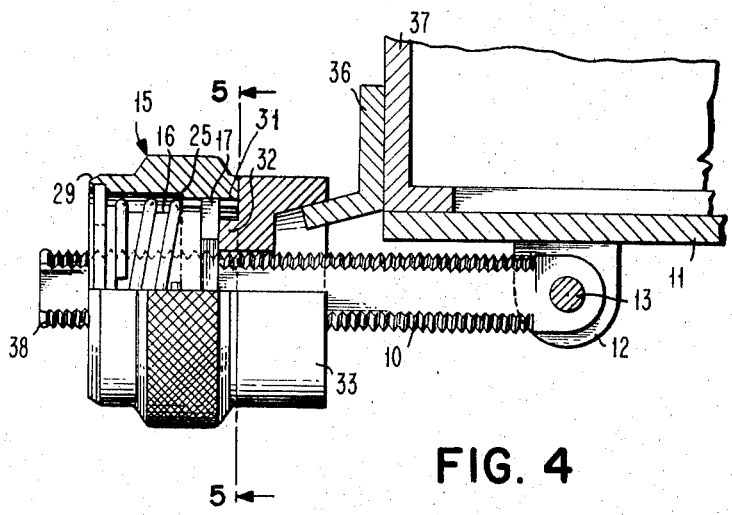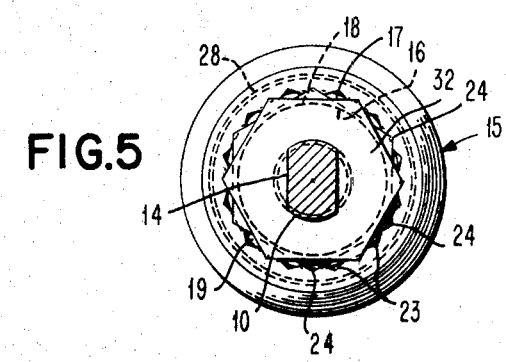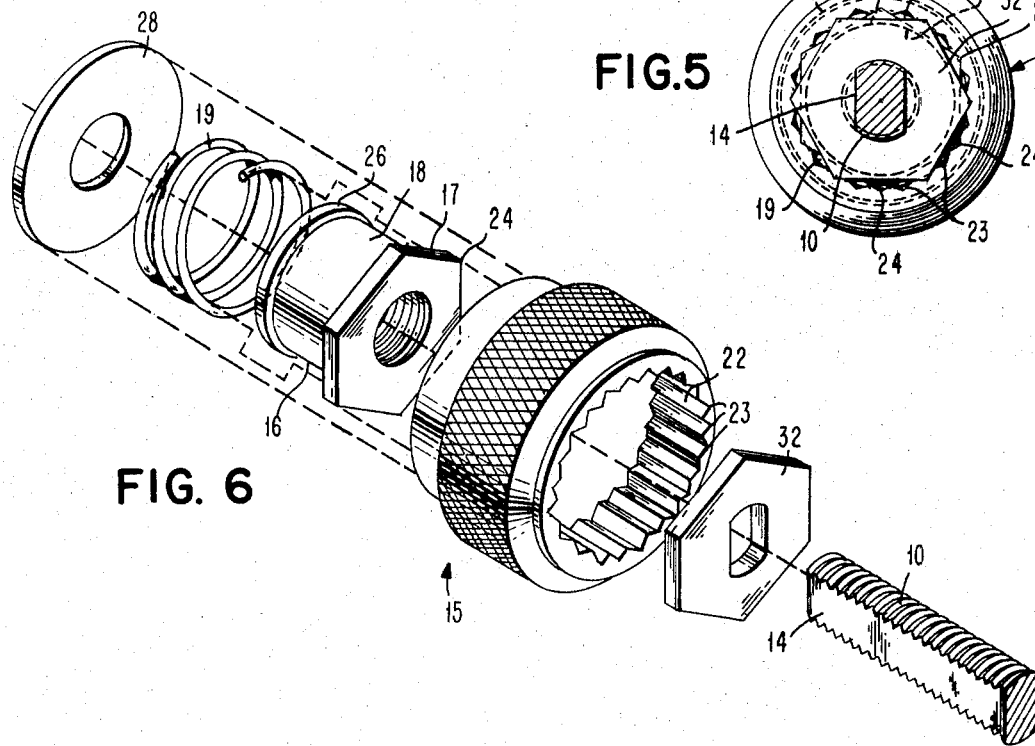

SELF-LOCKING FASTENER

BACKGROUND OF THE INVENTION

The invention relates generally to fasteners of the positive-locking type, and which employ a retractable spring mechanism by which the parts may be disengaged. More specifically the device comprehends a nut that is freely rotatable on a threaded spindle or bolt and in normal use is brought into engagement with a part to be clamped. A clamping member, freely slidable on the spindle but keyed against rotation with respect to it, may secure the nut if the spring-loaded locking device is retracted when the threading action brings the parts close together, followed by release of the spring mechanism to secure the nut to the clamping member and preclude further rotation of the nut on the spindle.

Devices of this type have become popular in military applications, and particularly for supporting instrumentation and other devices used on vehicles or on aircraft that normally are exposed to considerable vibration. Various expedients have been developed for overcoming tendencies of threaded fasteners to loosen while exposed to these vibratory conditions, and devices of the type described have been approved for replacing safety wiring or cotter pins extending through the nut, to facilitate mounting and demounting operations. Such constructions often include a retractable sliding tongue and groove or locking-pin arrangement that permits tightening the nut into close abutment with such a non-rotatable clamping member, and for making positive locking engagement between the two at that time. Devices of this general type have been known which utilize a generally gear shaped section on the clamping member to mesh with an internally splined sleeve having matching gear teeth or flutes to rotationally lock the nut and secure it against rotation when the toothed members engage one another.

It is proposed by means of the present invention to utilize parts of simplified design to reduce tooling and manufacturing costs. Specifically it is proposed to use a clamping member comprising a polygon having plain sidewalls, and a cooperating internally grooved member associated with the nut that slidably accommodates the diagonal edge portions of the polygon, with the number of grooves being a multiple of the number of edges (or faces) on the polygon. In this manner the clamping member may readily be made as a stamped washer, formed from standard polygonal rod, or it may be readily molded or sintered while the sleeve incorporates more readily formable shallow grooves, all as will become more fully apparent from the drawings, and from the detailed description.

BRIEF DESCRIPTION OF THE DRAWINGS

The scope of the invention is to be comprehended by the language contained in the claims, representative embodiments of the invention being herein shown for illustrative purposes only. In the drawings:

FIG. 4 is a longitudinal sectional view of a slightly variant form, similar to FIG. 1, but with the parts shown in locking position;

FIG. 5 is a cross-sectional view taken on the line 5—5 of FIG. 4; and

FIG. 6 is an exploded perspective view of the parts forming the nut, the spring-loaded sleeve and the polygonal clamping member, all of which are finally assembled on the threaded spindle.

DESCRIPTION OF THE PREFERRED EMBODIMENTS

Figure 1:
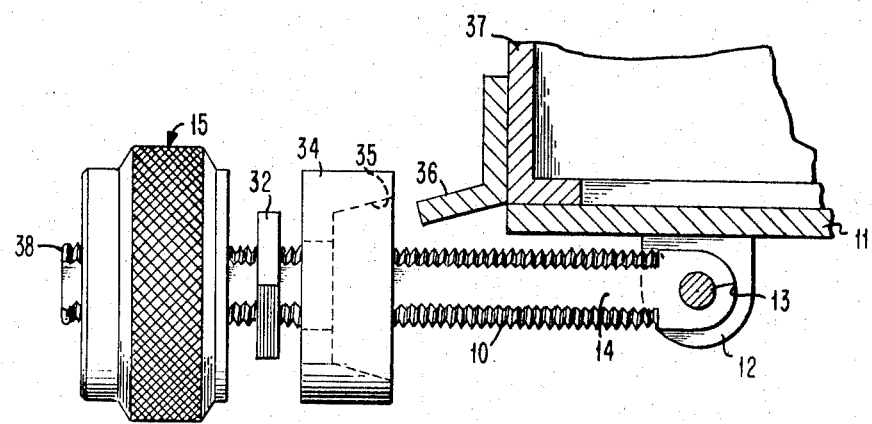
FIG. 1 is a side elevational view of the self-locking fastener in the disengaged position as applied to a typical metal chassis.

Referring again to the drawings, a preferred form of the invention comprises a threaded spindle or rod 10 which may be in the form of a conventional bolt, but is herein indicated as an eyebolt secured preferably at one end to a body to be clamped, such as a mounting platform 11 in any conventional manner, typically through the use of a clevis 12 and a pivot pin 13, which effectively hinge the spindle to the platform. The spindle 10 may be of polygonal cross section, or it may be provided as shown with one or more flat faces or slots 14, serving as splines by which other parts may be keyed thereon against rotational movement.

Figure 3:
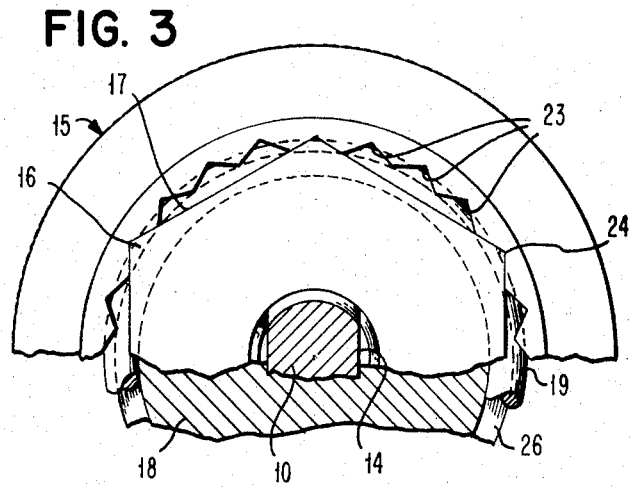
FIG. 3 is an enlarged partial cross-sectional view taken on the line 3—3 of FIG. 2.

A threaded assembly 15, comprising a nut 16, is internally threaded to accommodate the threaded rod 10 and to be freely rotatable thereon. The nut includes a polygonal outer wall portion 17 and a reduced diameter hub 18 adapted to receive a compression spring 19. The assembly 15 includes also a locking sleeve 21 having an inwardly projecting grooved region or portion 22 adapted to slidably receive and engage the polygonal outer wall portion 17, perhaps as best seen in FIG. 3. The polygonal wall portions 17 of the nut 16 are shown as the flat faces of a hexagon rod, while the grooves 23 have a V-shape with an internal angle matching that of the diagonal corners or edges 24 of the polygon, but the grooves preferably are provided in a number constituting a multiple of the number of edges 24 on the polygon. Thus in the example illustrated in FIG. 3 four grooves are provided for each of the hexagonal edges, making a total of 24 grooves, the internal angle of each groove in this case being 120°. With the arrangement illustrated, the knurled sleeve 21 becomes permanently keyed to the polygon 17, and imparts rotary motion to the nut 16 for threading action on the spindle 10 as the sleeve 21 is rotated, while being free to slide longitudinally or axially relative to the nut through a limited range.

Figure 2:
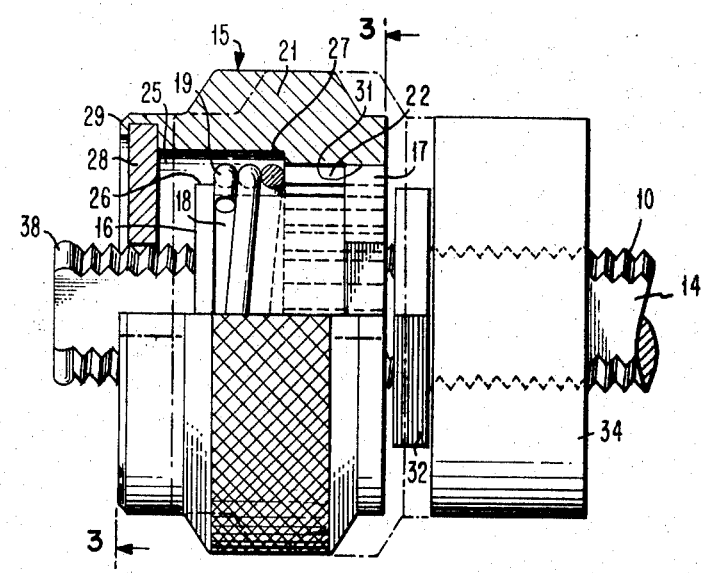
FIG. 2 is an enlarged sectional view of the nut and clamping member arrangement, and with the sleeve in retracted position, certain parts being shown in elevation.

The sleeve 21 is provided with a cavity 25 generally surrounding the hub 18 to provide operating space for the spring 19, which is of a size to function freely on the hub 18. When assembled, the spring may be compressed slightly even when in the expanded or relaxed condition between the portion 17 and a terminal flange 26. The spring is mounted about the hub by expanding the turns to clear the flange, and by allowing the turns to relax following assembly. The nut 16 is inserted through the left end of the sleeve 21 when looking at FIG. 2, and the polygonal portions 17 aligned with the grooves 23, and with these parts in sliding engagement, the threaded assembly 15 may be completed by permanently securing an end plate or a washer 28 in position as by rolling over adjoining peripheral edges 29 of the sleeve 21. When the spring 19 is in the expanded position, the sleeve 21 is urged toward the right by virtue of the pressure applied to the wall 27, the parts assume the relaxed position illustrated in FIG. 4, and a portion of the grooved region 22 projects beyond the end of the nut 16 to form an enclosure 31, the inner periphery of which naturally includes the grooves 23.

A clamping member 32 for making engagement with the work piece is slidably mounted on the threaded rod 10 but is keyed with respect thereto so as to be precluded from rotating on the rod. The clamping member 32 may comprise a simple washer as shown in FIG. 6, having a polygonal cross section with flat side faces of a number comprising a sub-multiple of the number of grooves in the sleeve 21, preferably having the same size and shape as the outer wall portion 17, and having a central aperture somewhat matching the cross section of, or being otherwise keyed to the rod 10. If preferred however, the clamping member 32 may include a clamping collar 33 as shown in FIG. 4, having as an integral part thereof the polygonal clamping member 32 facing the enclosure 31. Where used alone as illustrated in FIG. 6 the member 32 may be punched in hexagonal shape from sheet stock, or cut from hexagonal rod, whereas if included with an adaptor member such as the collar 33, it might be formed by sintering, casting, or molding, according to the requirements of the individual case. Assuming that the clamping member 32 is formed as a separate washer member, the adaptor member may take the form of a separate collar 34 which thereupon may be freely rotatable on the rod, and may be formed to make suitable contact with the work piece as shown in FIG. 1. In the example illustrated, the collar 34 contains a concave recess 35 adapted to engage and firmly secure a mounting lug 36 forming part of a typical mounted assembly, such as a chassis 37. Only one end of the chassis is shown, it being conventional for the opposite end to be mounted so as to oppose the clamping action of the device shown, and to allow the concave recess by bearing against to lug 36 to secure that end of the chassis firmly to the platform 11. When the parts have been fully assembled, the free end of the threaded rod 10 may be provided with an upset portion or similar obstruction 38, to preclude accidental removal of the threaded assembly 15 from the rod 10.

In operation, with the chassis applied in position on the platform as shown, the rod 10 is raised and the assembly 15 twirled to bring the parts into clamping relation. The nut 16 may approach the clamping member 32 to roughly the position indicated in FIG. 2, until a tendency develops for the polygonal member 32 to engage the grooves 23 within the enclosure 31 and thereby interferring with continued free rotation of the nut. At this point the sleeve is retracted to the position shown in FIG. 2 causing the polygonal portion 17 to fill the zone that previously defined the enclosure 31, and to bear against the clamping member 32 allowing continued tightening of the nut to the position shown in broken lines. When the parts are tightly engaged, the sleeve may be released, and with possible slight continued rotation of the sleeve until the parts are aligned typically as shown in FIG. 5, the sleeve moves toward the right until in the fully relaxed position, and the parts are firmly locked together, as shown in FIG. 4. It will be noted from FIG. 5 that the member 32 may occupy 24 different positions, and that the two polygonal members are not necessarily aligned in the same grooves.

With the present arrangement of multiple indexing, the grooves naturally are reduced in depth, but they are more readily formed as shallow V-grooves, either by sintering, molding, or broaching than individual gear teeth type splines. Similarly by reducing the number of faces and cooperating edges on the clamping member to a sub-multiple of the grooves, standard bar stock may be used for the parts without increasing the angle between indexed positions, or if the parts are molded or sintered, the complexity of the operation is reduced by the absence of small projections or re-entrant angles, and the likelihood of damage or breakage to the interlocking parts is reduced. With the illustrated version, using hexagon stock, six separate locking contacts are made between the mating parts, providing more than adequate locking action, though the use of octagonal or square stock for the parts may well be considered for particular applications.

I claim:

1. A self-locking fastener comprising a splined threaded rod, a nut threaded on said rod and having a polygonal outer wall portion, a locking sleeve having an inwardly projecting grooved portion for slidably receiving and engaging the corner edges of said polygonal outer wall portion and for normally imparting through such engagement rotary threading motion to said nut, resilient means for normally urging said sleeve to move axially to a relaxed position relative to said rod and to said nut whereby a part of said grooved portion extends beyond the end of said nut, to form an enclosure having a grooved inner periphery, and a clamping member freely slidable along said splined threaded rod but being keyed to said rod for precluding rotation of said member relative to said rod, said clamping member also having a polygonal outer peripheral portion engageable with said grooved inner periphery when said clamping member is located within said enclosure, thereby to lock said nut and sleeve against rotation relative to said threaded rod, said clamping member becoming disengaged from said enclosure when said sleeve is retracted from said relaxed position, thereby permitting rotation of said nut and sleeve relative to said threaded rod, the number of edges of said polygonal portion on said clamping member being a submultiple of the number of grooves in said sleeve.

2. A self-locking fastener as claimed in claim 1, wherein the polygonal portions of said nut and said clamping member have the same number of edges.

3. A self-locking fastener as claimed in claim 1, wherein said polygonal portions comprise flat faces and said grooves are V-shaped conforming to the corner edges of said polygonal portions.

4. A self-locking fastener, as claimed in claim 1, including a clamping collar freely slidable and rotatable on said threaded rod, and wherein said clamping member comprises a washer located on said rod between said collar and said nut.

5. A self-locking fastener as claimed in claim 1, wherein said polygonal portion of said clamping member comprises a hexagonal washer, and the grooves in said sleeve are shaped to receive and accommodate the diagonal edge portions of said clamping member in a plurality of successively indexed positions.

6. A self-locking fastener as claimed in claim 1, wherein said polygonal portions of said nut and said clamping member are both hexagonal in cross section, and wherein said grooves are of V-shape for receiving such hexagon in any indexed position.

* * * * *